United States Patent [19]

Konar et al.

[11] Patent Number: 5,396,415
[45] Date of Patent: Mar. 7, 1995

[54] NERUO-PID CONTROLLER

[75] Inventors: Ahmet F. Konar, Circle Pines; Tariq Samad, Minneapolis; Steven A. Harp, Coon Rapids, all of Minn.

[73] Assignee: Honeywell Inc., Minneapolis, Minn.

[21] Appl. No.: 829,996

[22] Filed: Jan. 31, 1992

[51] Int. Cl.⁶ ............................................. G05B 13/02
[52] U.S. Cl. .................................. 364/162; 364/148; 395/21; 395/903; 395/906
[58] Field of Search ............................... 364/148–166; 395/11, 13, 21, 20, 22, 23, 902, 903, 904, 906, 905, 907

[56] References Cited

U.S. PATENT DOCUMENTS

| | | | |
|---|---|---|---|
| 4,556,956 | 12/1985 | Dickerson et al. | 364/162 |
| 4,935,877 | 6/1990 | Koza | 395/13 |
| 4,990,838 | 2/1991 | Kawato et al. | 318/568.10 |
| 5,050,095 | 9/1991 | Samad | 395/23 |
| 5,109,275 | 4/1992 | Naka et al. | 358/80 |
| 5,111,531 | 5/1992 | Grayson et al. | 395/23 |
| 5,119,468 | 6/1992 | Owens | 395/22 |
| 5,121,467 | 6/1992 | Skeirik | 395/11 |
| 5,140,530 | 8/1992 | Guha et al. | 395/13 |
| 5,142,612 | 8/1992 | Skeirik | 395/11 |
| 5,159,660 | 10/1992 | Lu et al. | 395/22 |
| 5,167,009 | 11/1992 | Skeirik | 395/11 |
| 5,172,490 | 12/1992 | Tatsumi et al. | 34/54 |
| 5,197,114 | 3/1993 | Skeirik | 395/22 |
| 5,212,765 | 5/1993 | Skeirik | 395/11 |
| 5,224,203 | 6/1993 | Skeirik | 395/22 |
| 5,268,834 | 12/1993 | Sanner et al. | 364/151 |
| 5,282,261 | 1/1994 | Skeirik | 395/22 |

FOREIGN PATENT DOCUMENTS 0241286 10/1987 European Pat. Off. .
211324 6/1989 United Kingdom .

OTHER PUBLICATIONS

U.S. Patent Application Ser. No. 07/643,595, "A Two--Level System Identifier" no date.
U.S. Patent Application Ser. No. 07/809,903, "SAINT, A Closed-Loop Autoutner" no date.
Midwest Symposium on Circuits and Systems, "Using a Neural Network as a Feedback Controller", by John Y. Cheung and Robert J. Mulholland 1989.
T. Troudet et al. "Towards practical control design using neural computation International joint conference on neural networks" vol. 2, 8 Jul. 1991 pp. 675–681.
R. Swiniarski "Novel Neural network based self-tuning PID controller which uses Pattern Recognition" pp. 3023–3024 May 1990.
G. Karsai et al. "Learning to control some practical experiments with neural networks" pp. 701–707 Jul. 1991.
Allon Guez et la. "A neuromorphic Controller with a Human Tencher", date unknown, pp II–595–II602.
Kristinn Andersen et al., "Artificial Nerual Networks Applied to Ar Welding Process Molding and Control", Oct. 1990, pp. 824–830.
H. Bleuler, D. Diez et al., "Nonlinear Neural network control with Application Example", Jul. 1990, pp. 201–204.

Primary Examiner—James P. Trammell
Attorney, Agent, or Firm—John G. Shudy, Jr.

[57] ABSTRACT

PID controllers form a large proportion of controllers in use in many controlled systems today. This application describes how to use a neural network which receives PID inputs to be a controller and operate as a PID controller to save on retraining and provide other efficiencies in control. Also shown is the user selectability between PID conventional controllers and Neural Network controllers.

13 Claims, 5 Drawing Sheets

NERUO-PID CONTROLLER

BACKGROUND OF THE INVENTION

This invention relates to the field of nonlinear controllers and is particularly adapted to augment conventional Proportional-Integral-Derivative (PID) controllers function more effectively for controlling time varying dynamic processes and systems.

Controllers are inherently complex since they control dynamically changing systems, trying to match a desired response with the system output. (The desired response can be a setpoint change or the output curve of a reference model exhibiting the desired response characteristics. In most real control situations, one would not expect, and cannot achieve, the process output being brought to setpoint instantaneously. Therefore, following the presumed optimal curve is the goal.)

Both by virtue of and despite their simplicity, linear controllers continue to be the workhorse of control applications. In particular, the vast majority of current applications employ proportional-integral-derivative (PID) controllers. In the aerospace as well as process industries, PID control has proven to be easy to use and to provide adequate performance. PID controllers are also general purpose, that is, the same controller structure can be used for a broad range of applications.

Yet PID control is far from ideal. For any nontrivial application, we know that nonlinear controllers can substantially outperform a PID. For specific plants, high-performing nonlinear controllers can be designed. But, in practice, this has required unique designs for each enterprise, with concomitant high cost and complexity. At this time there is no formal approach for developing general nonlinear controllers.

We have developed a "NeuroPID Controller" concept that is a potential solution to this problem which employs a neural network to realize a nonlinear controller but retains the PID interface.

Thus, it exhibits the easy to use and application-independent properties of conventional PID controllers, while utilizing the nonlinear dynamical system modeling properties of neural networks to realize control laws that are more robust, accurate, and generalizable to applications than other approaches.

PID controllers are used ubiquitously for conventional controls. As conventionally formulated, these PID controllers use six input signals to generate an output to drive the plant process. The inputs are signals which represent on the one hand, controller parameters (or gains) $K_C$, $K_I$ and $K_D$ and, on the other, three error signals: the error between the setpoint or reference model response and the process response, e, the integral of this error, $\int e$, and the derivative of this error, $\dot{e}$. This function computed by conventional PID controllers is a linear weighted sum of the error signals:

$$u_{PID} = K_C e + K_I \int e + K_D \dot{e}$$

It may be computed either in analog or digital fashion to yield $u_{PID}$.

$K_C$, $K_I$, and $K_D$ are controller parameters, or gains. Their values uniquely determine controller output. In the conventional PID paradigm, it is assumed that by increasing the proportional gain $K_C$, we can increase the closed loop bandwidth (reducing the time needed to attenuate disturbances); by increasing the derivative gain $K_D$ we can increase the damping (reducing overshoot): and by increasing the integral gain $K_I$ we increase the system robustness (reducing sensitivity to disturbances) and reduce steady-state tracking errors. The behavior of the closed loop system (dynamic system), however, does not always decouple in this way. That is, increasing integral gain may reduce damping, or increasing proportional feedback can increase sensitivity, etc. In practice, the user installs a PID controller box in a feedback loop and adjusts the gains until the closed loop response of the system is a good compromise among the user's competing objectives.

There is no theoretical reason to believe that this is the optimal function of these six quantities and, in fact, it is unlikely to be the optimal function especially in a large search space of possible nonlinear functions. Therefore, conventional PID controllers are not as good as they could be if the correct nonlinear function were applied to the PID control parameters. This invention shows two approaches to produce more effective PID controllers that can introduce nonlinear functions into the conventional PID paradigms. In addition, because of the identical interface with the conventional PID, much of the "jacketing software" implemented with many PID installations (e.g., anti-reset-windup, bias offset) is directly applicable to the NeuroPID. Our approach to dynamic neural networks has allowed us to use general connectivity patterns and associates dynamics with processing elements. In other words, neural networks that have dynamic elements whose outputs are fed back into the network, can be used to allow for accurate neural network modeling representation of dynamic systems. Therefore, not only can linear systems be controlled with neural network based controllers but, in particular, nonlinear dynamic systems can as well. As we demonstrate below, PID parameters can be used to effectuate this control.

A NeuroPID may be used in industrial plant control, and environmental control situations, as well as flight control. For example, in the flight control domain, the NeuroPID is advantageous for several reasons:

In the flight control domain, relatively simple controllers are essential in certain applications. Sophisticated model-based controllers, for example, cannot satisfy the computational constraints imposed by small flying systems. The memory and processing resources required by NeuroPID controllers are more than for conventional PIDs, but well within these constraints, even for software implementations.

A well established approach to designing PID-based flight controllers exists. This same approach, or a simplified version of it, could be used for developing NeuroPID flight controllers. Gain scheduling can be used with the NeuroPID just as with PID control.

Reasonably accurate aircraft models are available to be used during the design process.

In principle, existing systems can even be retrofitted with NeuroPID controllers with minimal effort.

SUMMARY OF THE INVENTION

In the preferred embodiment of this invention, a neural network is used to perform these optimal functions. In another preferred embodiment, the nonlinear functions may be performed with look-up tables or algorithmic processors.

Neural networks have been used in the past, for instance, see Ser. No. 07/643,595, in which a neural network was used to generate equations which identify a controlled process, and Ser. No. 07/809,903, where neural networks have been demonstrated to have applicability to autotuners for PID controllers.

In this invention, the neural network is applied to the PID controller, substituting for a linear equation based controller processor, a dynamic neural network processor which is capable of generating output representative of higher order equations. While nondynamic neural nets could be used, it is preferred that they be dynamic with internal feedback. An example can be found in U.S. Pat. No. 5,050,095.

In one implementation, the neural network controller may be turned off and a conventional PID controller which is mounted in parallel can be used.

Figure 8:
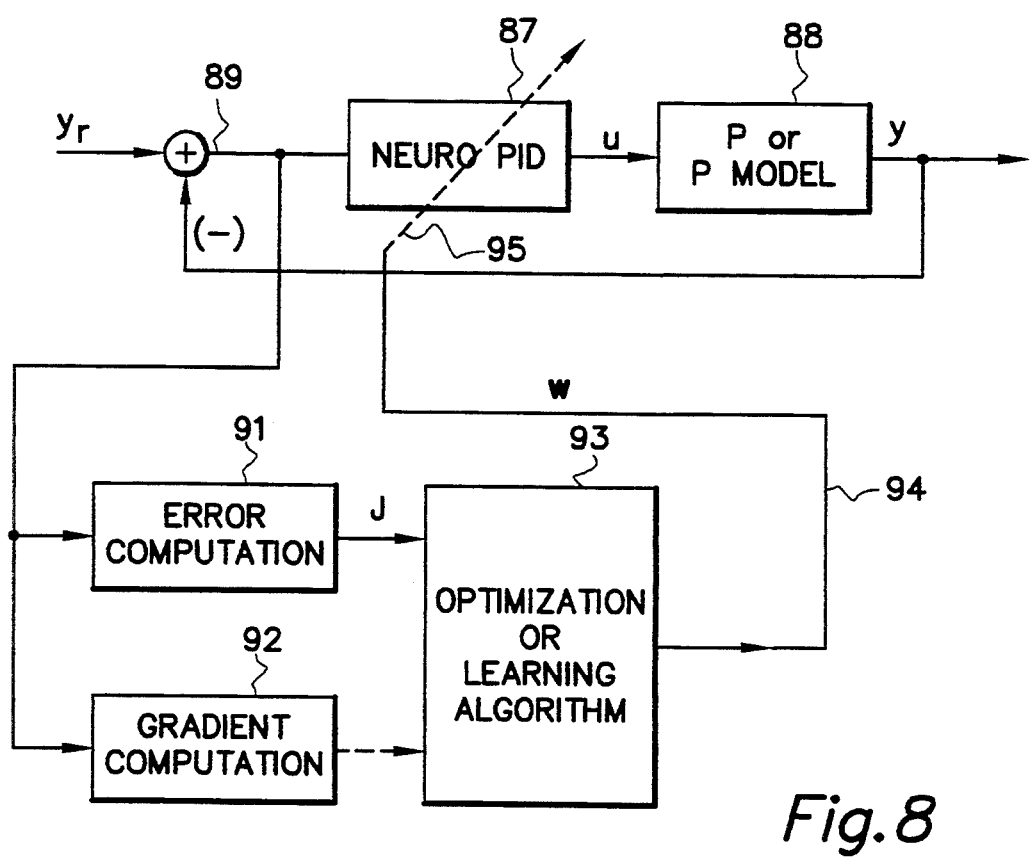
FIG. 8 is a heuristic block diagram for indicating how the training of a NeuroPID controller may be accomplished.

In FIG. 8, a controller is described for nonlinear closed loop systems which has $K_I$, $K_C$ and $K_D$ parameter inputs, as well as an input related to the output of the process being controlled (e), where the controller contains a mechanism for generating control signals (u) from these inputs. The (e) input may be y and $y_r$ if desired. The (e) input contains some representation of the error between the output of the process and the setpoint. Whether this error is computed outside or inside the controller may be immaterial to the effectiveness of the controller, but different embodiments result.

The mechanism for generating control signals (u) may either be a neural network trained on: the error signal, $K_I$, $K_D$, and $K_C$, for the expected processes to be controlled, usually and preferably through simulation; or, the mechanism may be some representation of the trained neural network. If a representation, rather than the network itself, this representation may be embodied in a look-up table with an associated processing mechanism, or may be a processor containing a set of these equations to calculate the appropriate values for the signals to be generated. Either of these may be generated by reference to a trained neural network's internal weights, or otherwise established empirically, or through modeling.

DETAILED DESCRIPTION OF THE PREFERRED EMBODIMENT

The invention described herein can be applied to replace typical and conventional PID controllers, and special purpose NeuroPID controllers can be developed for specific applications, such as, for example, flow control, level control or temperature control. Application-specific NeuroPIDs would be optimized for a smaller range of processes and thus may be considerably less expensive, both to manufacture and to operate. A major advantage of a NeuroPID controller is that a user (the process operator) may deal with it in the same way that he currently deals with a PID controller. Particularly, the user specifies $K_C$, $K_I$ and $K_D$ parameters. Thus, it will not be difficult to retrain users to employ NeuroPID controllers.

The interface to the controlled system is also the same because the NeuroPID operates on exactly the same signals as a conventional PID controller, and produces signals which operate the process in the same way as the conventional PID controller.

It should be mentioned that the NeuroPID controller is not an adaptive controller or a model-based controller. However, embodiments which do not use a neural network may be considered model-based controllers in one sense of the word. The operating NeuroPID controller does not involve model identification nor parameter estimation. It replaces or supplements the normal PID controller function with a nonlinear mapping, as is explained herein.

Figure 1:
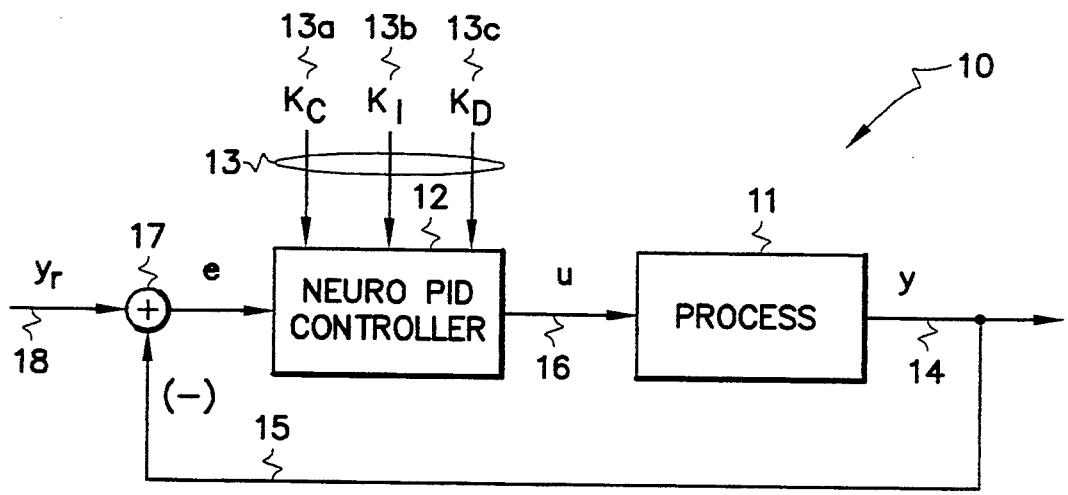
FIG. 1 is a block diagram of a closed loop process controlled by a NeuroPID controller.

Referring first to FIG. 1, the closed loop 10 controlled process 11 and NeuroPID controller 12 can generally be said to be responsive to a setpoint input $y_r$ on line 18. A change or difference between the setpoint $y_r$ entered on line 18 and the output signal from the process y output on line 14 generate, through a summer, a differential or an error signal e, which is input on line 15 to the NeuroPID controller 12. The NeuroPID controller 12 receives PID parameter input signals 13 and, based on the combination of inputs 13 and 15, generates an output of controls signals u on line 16, which drive the control features of the process (opening valves, speeding up or slowing down motors, etc.). The PID input 13 represent gain parameter values.

Figure 2:
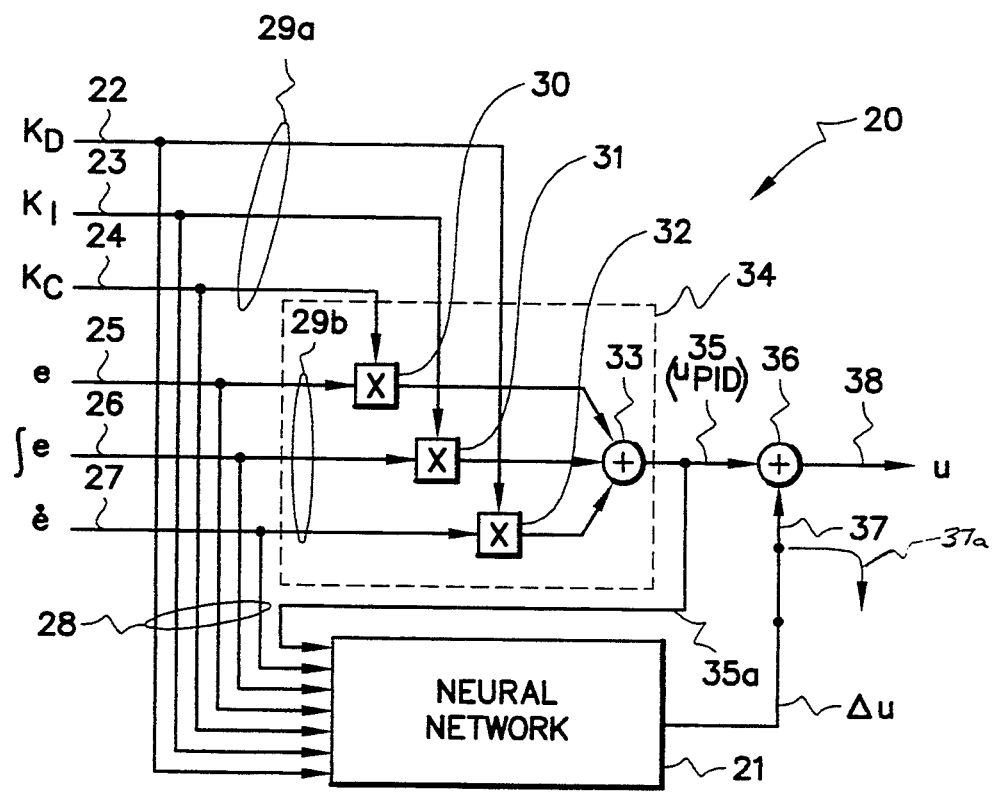
FIG. 2 is a block diagram of a neural network receiving input parameters, $K_D$, $K_I$, $K_C$, and the error, derivative error and integral of the error, and having a final output $u_{PID}$.

A conventional PID controller would look generally like block 34 in FIG. 2. Depending on whether the NeuroPID or the conventional PID were desired, this parallel set up allows the operator to merely choose the desired controller structure. In one preferred embodiment, a hybrid conventional and NeuroPID controller consists of both the conventional PID controller block (in dotted) 34, and the neural network controller 21. This conventional NeuroPID exists in the place of block 12 of FIG. 1. Thus, they form a controller 20 having inputs 22-27, including the three PID parameters ($K_I$, $K_C$, $K_D$), and the error, derivative and integral errors (e, $\int e$, and $\dot e$). ($\int e$, and $\dot e$ error signals can be computed directly from e, using analog or digital operations. This computation is assumed to be accomplished inside the block 12 in this case.) All six of these inputs are sent to one form of the neural network 21 on lines 28. They are also sent, on lines 29a and 29b, to conventional controller block 34. Here, the signal on line 25 (the error signal e) is multiplied by the proportional parameter value ($K_C$) on line 24, the integral of the error on line 26 is multiplied by the integral parameter on line 23, and the derivative parameter on line 22 is multiplied by the derivative of the error on line 27. These multiplications being represented by heuristic multiplication processor blocks 30, 31 and 32, respectively. The outputs of these heuristic multiplication blocks are added together in an addition processor 33 to produce an output signal on line 35 in accordance with the well known equation:

$$u_{PID} = K_C e + K_I \int e + K_D \dot{e}.$$

Depending on whether conventional PID or NeuroPID operation is desired, the switch 37 is turned on or off. When on, the controller output u is the sum of the conventional PID output ($u_{PID}$) and the output of neural network 21 ($\Delta u$). When off, the neural network output can be used directly from tap 37a.

For reference, but as is well known by those of ordinary skill in the art, conversion devices of some kind may be employed between the signal u and the process 11 (FIG. 1) such that an appropriate signal level for each of the controllable or actuatable elements in the process is generated.

As presently preferred, line 35a can bring the PID output from conventional controller 34 as an additional input to the neural network. This adds robustness to the final output u. It may also decrease training time, and other benefits may accrue.

Figure 2A:
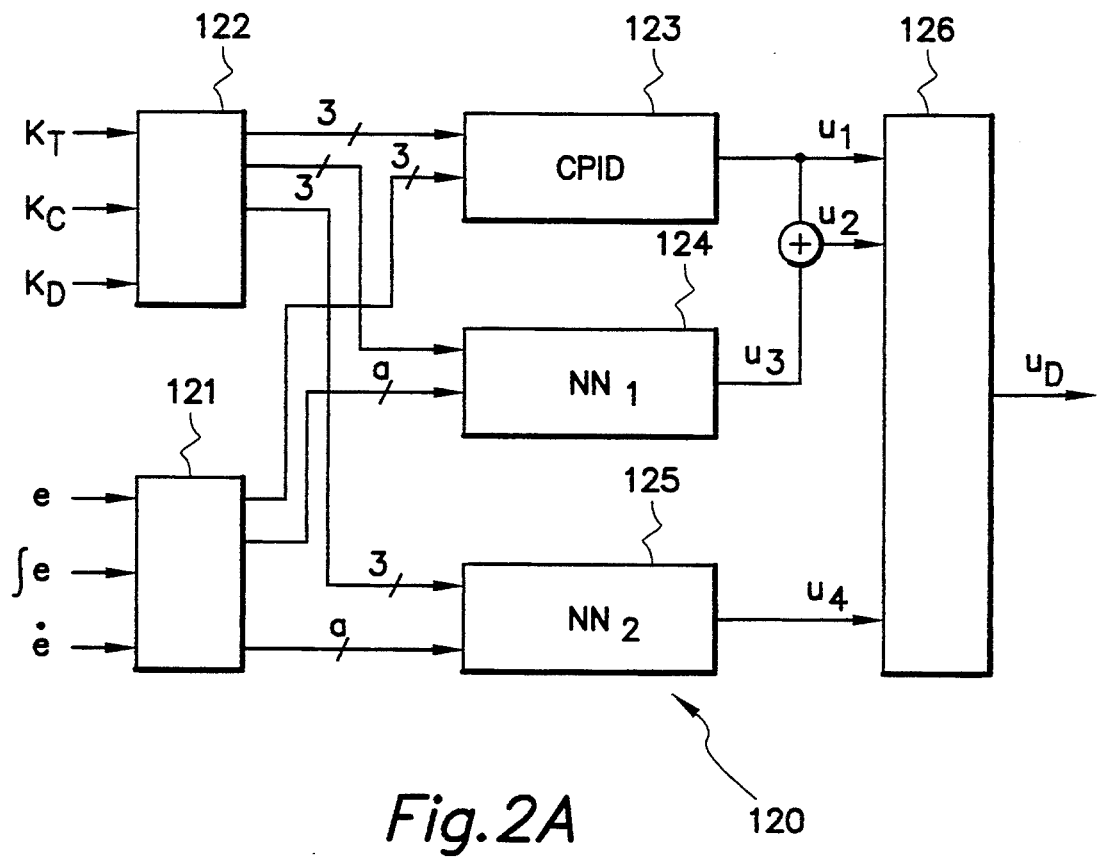
FIG. 2A is a block diagram of two neural network, and one PID conventional, controllers set upon a hybrid controller.

Refer now to FIG. 2a wherein a more complex hybrid controller 120 is shown, with the PID parameter inputs entering through a multiplex unit 122 and being delivered on three lines to the conventional PID controller processing unit 123, and two neural network controller processing units 124 and 125. The error inputs come in through multiplex unit 121 on three lines again, to the conventional PID processor 123, and at least one of the error signals is sent to the neural network processors 124 and 125. Neural network processor 124 ($NN_1$) is trained in a closed loop system having itself and the CPID processor 123 extant as part of the model. The other neural network processor ($NN_2$) 125 is trained in the closed loop system without the PID conventional processor present. Thus, the output u3 consisting of control signals from the neural network processor 124, will be different from the output u4, consisting of control signals from the neural network processor 125. In this hybrid controller 120, the user may select by the use of the multiplexor 126, the desired output control signals ud, being either the output u1 from CPID 123, u2 being the additive output of CPID 123 and $NN_1$ 124, or the output of the neural network alone, u4.

Figure 3:
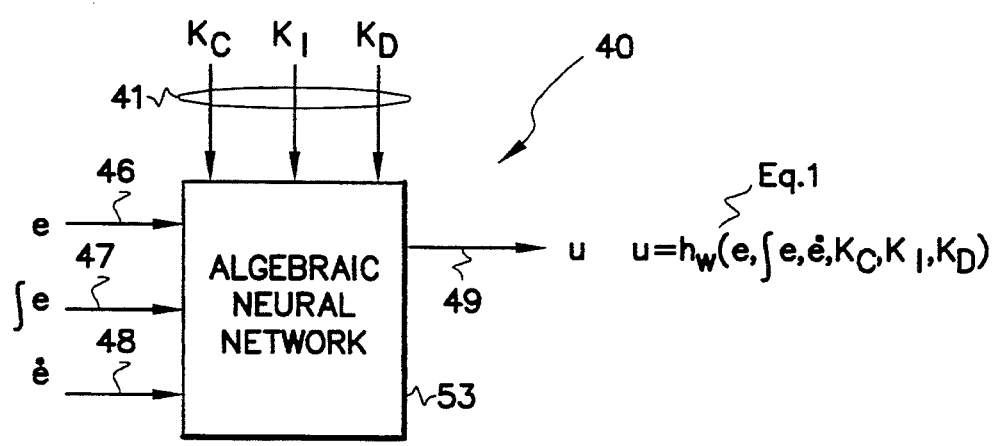
FIG. 3 is a block diagram of an algebraic neural network controller utilizing the same inputs as those inputs in FIG. 2.

The simplest form of NeuroPID controller would be one similar to that described in FIG. 3 which (would fit into the space of block 12 in FIG. 1 and) uses a processor or set of processors (either hardware or software) to implement equation Eq1 to generate an output u on line 49 from inputs 41 and error inputs 46, 47 and 48. Note that this equation allows no possibility of representing control loop dynamics other than the precomputed e, $\int e$ and $\dot{e}$. In the equation Eq1, the output is a function of the weights ($\eta_w$) in the neural network and to the network inputs.

Figure 4:
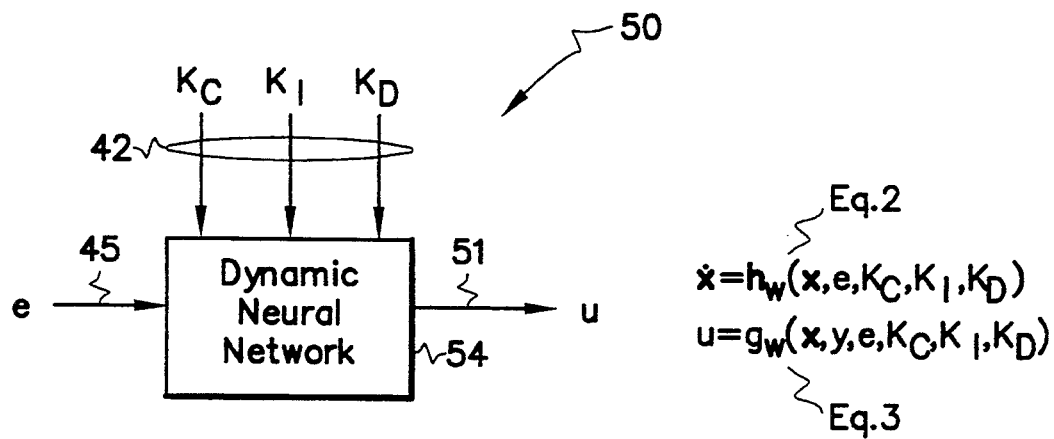
FIG. 4 is a block diagram of a dynamic neural network controller utilizing the error input.
Figure 5:
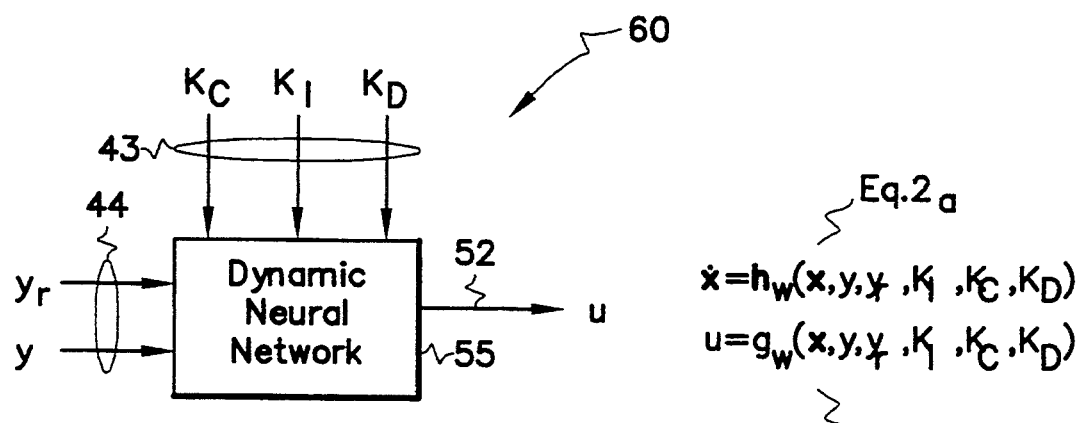
FIG. 5 is a block diagram of a dynamic neural network controller using both the output and the setpoint or reference model response to indicate the error.

Referring now to FIG. 4, it can be seen that with little change to the inputs, the value of the output signal can be said to be responsive to the arbitrary dynamical properties of the closed loop system. The same is true with FIG. 5 wherein the inputs are $y_r$ and y instead of simply the error. In equation Eq2, a state variable x can be said to be a function of the weights of the vector x and e. The output is thus a function ($\eta_w$ of the vector x and e). The difference between FIGS. 4 and 5 can also be seen by comparing the equations Eq2a and Eq3a against equations Eq2 and Eq3. In equations Eq2 and Eq3, the neural networks realize a nonlinear dynamical system. x represents the state variables of this system. Eq2 determines how the state variable evolve over time (the notation $\dot{x}$ indicates the rate of change of x, or dx/dt), and Eq3 determines the output of the neural network at any time. Both the network output and its next state are thus functions of the current state x, the error signal e, and controller parameters $K_C$, $K_I$ and $K_D$.

Eq's 2a and 3a are exactly analogous, except that here the network is given $y_r$ and y as input, rather than e (note that $e = y_r - y$).

As is well understood by those who use neural networks, training is important. Neural network training is generally performed in order to determine values for network weights so that the desired functionality is obtained by the NeuroPID controller for the controlled process. Training can be viewed as a nonlinear optimization process. It is similar to attempting to minimize a cost function. In general, we try to determine values for the network weights w that minimize the squared integral error between a desired process output $y_r$ and the actual process output y. The actual process output y is a function of the network weights w over some time interval of interest. The process output y is only indirectly a function of network weights. The network itself is producing the control output u.

For more detail on training NeuroPID controllers which employ neural networks, refer to FIG. 8. The weights w are variable, as indicated in this heuristic representation by dotted line 95. The weights exist in the NeuroPID controller 12 (FIG. 1) or NeuroPID controller 87. The difference between y and $y_r$ can be fed into an error computation processor of some kind 91 for error index computation. This error index could be called J and this, then, would be applied to an optimization processor or a learning algorithm processor for optimization of the weights in processor 93. The output 94 would be the new values for w (also expressed as w). These could be in the form of adjustments to the weights, i.e., $\Delta w$, if desired, rather than a signal representing the value of the weights. Alternatively, and including a representation of the error index J, the gradient computation may be made first, yielding $\nabla_w J$, which is a vector of the partial derivative of J with respect to the first weight, the partial derivative of J with respect to the second weight, and so on, until all the weights values have been stated. Optimization may be accomplished on a gradient or nongradient basis. Typical gradient-based optimizations include "gradient descent", which is $\Delta w = -\eta \nabla_w J$, or $w_{(t+1)} = w_{(t)} - \eta \nabla_w J$; the Levenberg Marquardt formulation and the conjugate gradient ($\eta$ is known as a learning rate parameter by convention). A nongradient basis for optimization may also be used, including the use of genetic algorithms. References to genetic algorithms for neural network training are established in the art a description may be had with reference to Montana and Davis, "Training Feedforward Neural Networks Using Genetic Algorithms", pp1-10, 1989, Dress and Knisley "A Darwinian Approach to Artificial Neural Systems, IEEE, pp 572-577, 1987, and U.S. Pat. No. 4,935,877

(Koza), as well as copending U.S. application Ser. No. 07/329,623, U.S. Pat. No. 5,140,530.

Figure 7:
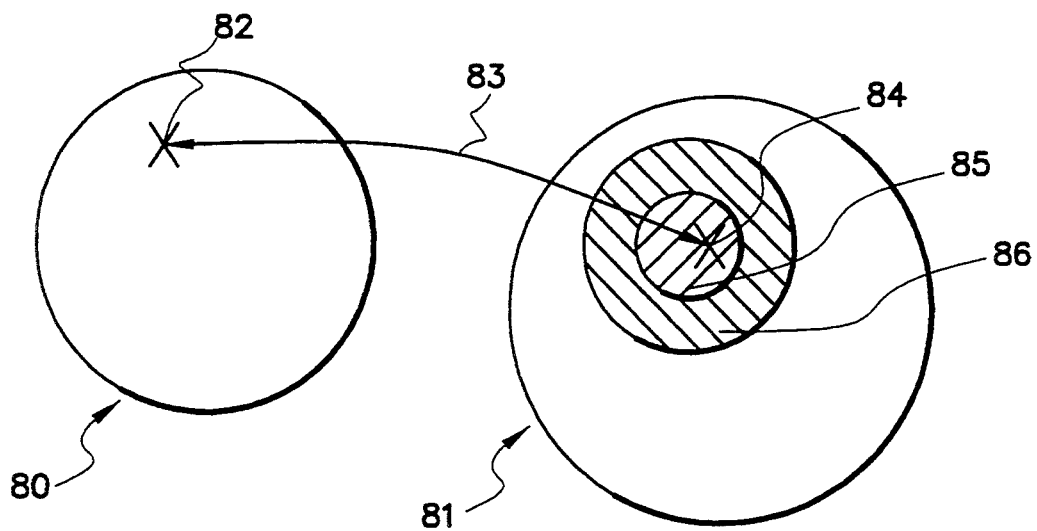
FIG. 7 is a Venn diagram relating problem and solution spaces.

Refer now to FIG. 7 in which the Venn diagram universe of PID parameters 80 and the Venn diagram universe of processes 81 are shown. The tuning criterion is described by the double-arrowed line 83. There is a correspondence between a process (a point 84 in the space 81) and a set of PID 82 parameters (a point 82) in the space 80). Process 84 is best controlled by the parameter set 82. A solution at 82 is optimized for a particular system 84. However, using a PID controller of the conventional type, a set of systems or processes may be adequately controlled as defined in area 85. Area 86 defines the additional range of processes that a NeuroPID controller will be able to control with the same PID settings of $K_C$, $K_I$ and $K_D$ represented by the point at 82.

Figure 6:
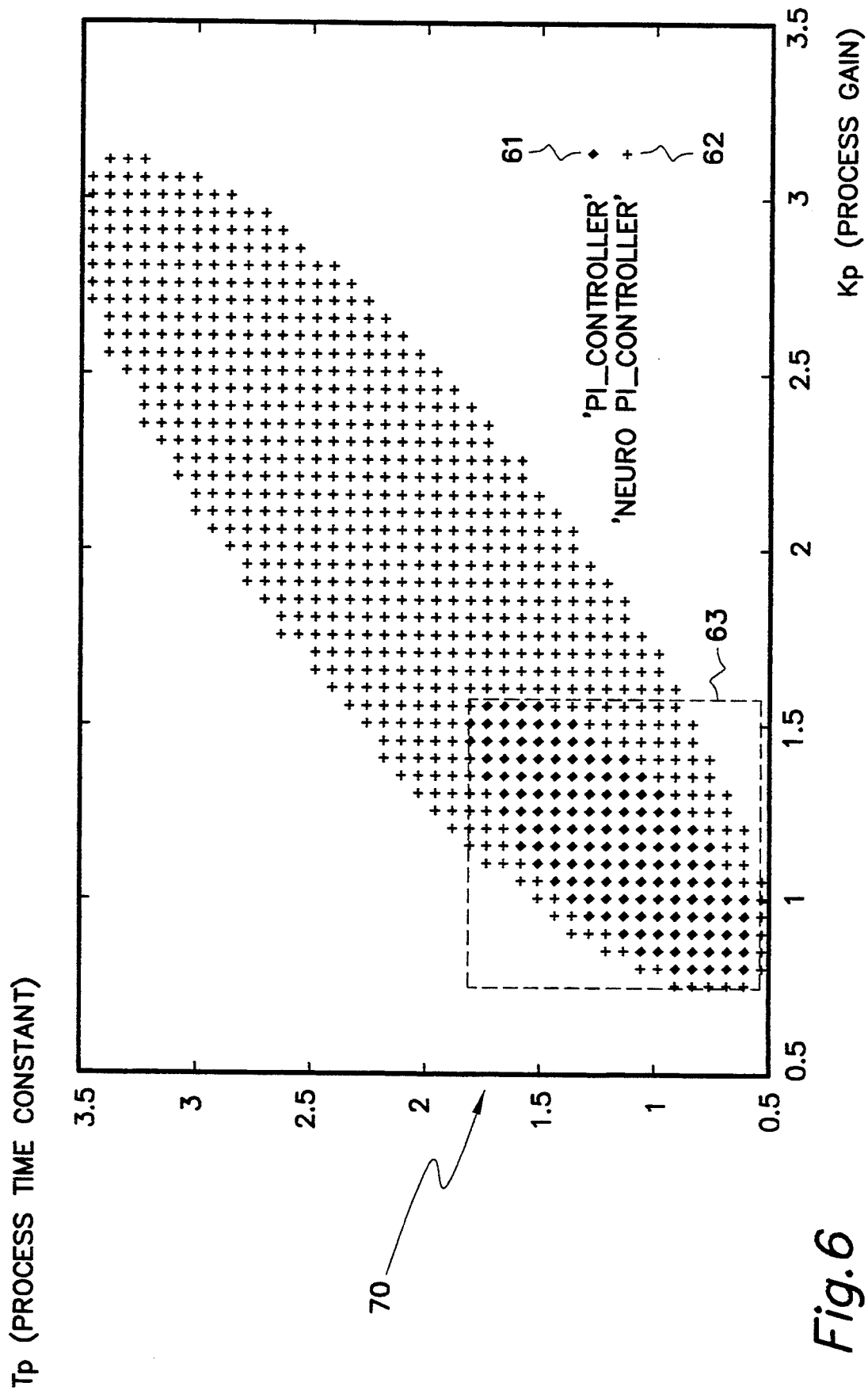
FIG. 6 is a chart of points generated by a neuro-PI controller and a similarly situated conventional PI controller.

Referring now to FIG. 6, the time constant of a process is plotted along the y axis of the chart, and the x axis indicates the range of process gain. The range of processes available for control with a PI controller with fixed parameters $K_C=2$, $K_I=2$, is plotted using symbol 61, and control with a NeuroPI controller with the same PID settings, is plotted using symbol 62. This plot was made using a NeuroPID controller having weights restricted to the (−1, 1) interval, with 128 discretized values each (i.e., 7 bits per weight). The NeuroPID controller had three training runs conducted without exploration of the efficient neural network architecture and learning algorithm parameters. A simple optimization criterion was used. For the example, only first order process models were used, with $K_D$ set to zero. These kinds of PID controllers are well suited to such testing because they are probably optimal given a fixed known process and a first order reference model. The reference model transfer function assumed was 1/(0.5+1), unity gain, and a time constant of 0.5 units. For an actual process of 1/(s+1), the closed loop system perfectly matches the reference model with the above controller settings of $K_C=2$, $K_I=2$. As the process parameters drift, the match becomes poorer.

To evaluate robustness, a criteria for adequate control was formulated. The integral square difference between the process step response and reference model should be no greater than 0.5. For both the PI controller and the trained neuroPI controller, the regions of adequate control (FIG. 6) were computed by systematically varying process parameters and computing whether the resulting closed loop system (with $K_C$ and $K_I$ set to 2.0 throughout) was acceptable by the above criterion. Even in this simple example, the neuroPI controller region is 480% larger. The training space 63 for the neuroPI controller was a rectangular box, tightly bounding the PI region of adequate control. Thus, most of FIG. 6 represents neuroPI generalization. The NeuroPID can be said to be adequately controlling processes well beyond the range of its training.

It should be noted that a controller would be considered a PID controller if its input parameters are some combination of parameters of the set of parameters $K_I$, $K_C$ and $K_D$. This invention can apply in any such case.

What is claimed is:

1. A nonlinear controller for a closed-loop system, having PID parameter values as inputs (variable values $K_I$, $K_C$, $K_D$) and a process response related and setpoint related signal value as input, wherein said nonlinear controller contains a processor mechanism for generating an output signal value u for controlling said closed-loop system from said inputs and wherein said processor mechanism is a neutral network trained on inputs e, $K_I$, $K_D$, $K_C$, which are generated by a model of the system to be controlled.

2. A nonlinear controller as set forth in claim 1 wherein said related input contains a representation of the error which represents the difference between the desired response ($y_r$) and the process response (y).

3. The controller as set forth in claim 1 wherein said process response related input is two input signals; one representing the desired response ($y_r$) and one representing the process response (y).

4. A nonlinear controller for a closed-loop system, having PID parameter values as inputs (variable values $K_I$, $K_C$, $K_D$) and a process response related and setpoint related signal value as input, wherein said nonlinear controller contains a processor mechanism for generating an output signal value u for controlling said closed-loop system from said inputs and wherein said mechanism is a processor that is representative of the optimum equation for the controller output u and wherein said optimum equation is represented by a process containing equations for processing input signals which have been derived by parsing them out of neural network systems trained on equivalent processes.

5. A nonlinear controller as set forth in claim 4 wherein said related input contains a representation of the error which represents the difference between the desired response ($y_r$) and the process response (y).

6. The controller as set forth in claim 4 wherein said process response related input is two input signals; one representing the desired response ($y_r$) and one representing the process response (y).

7. A controller for a closed loop system having a conventional PID controller and a NeuroPID controller which has been trained on the system, wherein the user may select to employ either the output of the NeuroPID controller combined with the conventional PID controller, or the conventional PID controller output alone said user selection being made in a set of ways including, during operation of the controller by a user input switch means, and by automatic means responsive to preselected user criteria.

8. A controller as set forth in claim 7 wherein the output from the conventional controller is an input to the NeuroPID.

9. A controller for a closed loop system having a conventional PID controller and two neural network controllers, wherein one of said neural network controllers is a first NeuroPID controller trained on the closed loop system as set forth in claim 7, and wherein the second neural network controller has been trained on an identical controlled system except that said identical system has only a NeuroPID controller but no conventional PID controller, and wherein the user may select as controller output, from the set of possible outputs: a combination of the first NeuroPID controller output with the conventional PID output, the conventional PID output, and the second neural network output, said user selection being made in a set of ways including, during operation of the controller by a user input switch means, and by automatic means responsive to preselected user criteria.

10. A controller as set forth in claim 9 wherein the output from the conventional controller is an output to the first NeuroPID.

11. A nonlinear controller for a closed-loop system, having PID parameter values as inputs (variable values $K_I$, $K_C$, $K_D$) and a process response related and setpoint related signal value as input, wherein said nonlinear controller contains a processor mechanism for generating an output signal value u for controlling said closed-loop system from said inputs and wherein said mechanism is a processor that is representative of the optimum equation for the controller output u and wherein said optimum equation is represented by a process containing look-up tables for processing input signals which have been derived by parsing them out of neural network systems trained on equivalent processes.

12. A nonlinear controller as set forth in claim 11 wherein said related input contains a representation of the error which represents the difference between the desired response ($y_r$) and the process response (y).

13. The controller as set forth in claim 13 wherein said process response related input is two input signals; one representing the desired response ($y_r$) and one representing the process response (y).

* * * * *